United States Patent
Hwang et al.

(10) Patent No.: US 12,147,364 B2
(45) Date of Patent: Nov. 19, 2024

(54) AUXILIARY PROCESSOR AND ELECTRONIC SYSTEM COMPRISING THE SAME

(71) Applicant: SAMSUNG ELECTRONICS CO., LTD., Suwon-si (KR)

(72) Inventors: Jin Woo Hwang, Seongnam-si (KR); Hoon Sung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/748,403

(22) Filed: May 19, 2022

(65) Prior Publication Data

US 2023/0110369 A1    Apr. 13, 2023

(30) Foreign Application Priority Data

Oct. 13, 2021    (KR) .......................... 10-2021-0135592

(51) Int. Cl.
*G06F 13/28*     (2006.01)
*G06F 9/30*      (2018.01)

(52) U.S. Cl.
CPC .......... *G06F 13/28* (2013.01); *G06F 9/30134* (2013.01)

(58) Field of Classification Search
None
See application file for complete search history.

(56) References Cited

U.S. PATENT DOCUMENTS

| | | | |
|---|---|---|---|
| 5,675,750 A * | 10/1997 | Matsumoto | G09G 5/363 710/200 |
| 5,754,436 A * | 5/1998 | Walsh | G06F 9/30083 700/286 |
| 5,822,251 A * | 10/1998 | Bruce | G06F 13/28 714/E11.038 |
| 6,038,624 A * | 3/2000 | Chan | G06F 13/4081 710/10 |
| 7,512,021 B2 | 3/2009 | Houda et al. | |
| 7,603,489 B2 | 10/2009 | Ikeucki | |
| 8,843,727 B2 | 9/2014 | Schoinas et al. | |
| 9,247,093 B2 | 1/2016 | Katsunoi | |
| 9,830,288 B2 * | 11/2017 | Diard | G06F 13/28 |
| 10,049,668 B2 * | 8/2018 | Huang | G10L 15/285 |
| 10,452,594 B2 * | 10/2019 | Waechter | G06F 13/28 |
| 10,459,674 B2 * | 10/2019 | Whitby-Strevens | G06F 3/14 |
| 10,733,956 B2 | 8/2020 | Meixner et al. | |
| 10,754,774 B2 * | 8/2020 | Choudhari | G06F 9/45558 |
| 10,853,277 B2 * | 12/2020 | Liang | G06F 13/28 |
| 11,182,315 B2 * | 11/2021 | Weissmann | G06F 9/30076 |

(Continued)

FOREIGN PATENT DOCUMENTS

JP    2015-034891    2/2015
JP    2021-040889    3/2021

*Primary Examiner* — Ilwoo Park
*Assistant Examiner* — Christopher A Bartels
(74) *Attorney, Agent, or Firm* — F. Chau & Associates, LLC

(57) ABSTRACT

An electronic system includes an auxiliary processor. The auxiliary processor includes a remapping device which receives data through a direct memory access (DMA, a register unit which stores the data, and processing logic which transmits operating status information to the remapping device. The remapping device remaps position information in which the data is stored in the register unit on the basis of the operating status information.

20 Claims, 20 Drawing Sheets

(56) References Cited

U.S. PATENT DOCUMENTS

| | | | |
|---|---|---|---|
| 11,243,903 B2* | 2/2022 | Waechter | G06F 13/4234 |
| 11,269,529 B2* | 3/2022 | Li | G06F 3/064 |
| 11,360,920 B2* | 6/2022 | Patrick | G06F 13/385 |
| 11,386,029 B2* | 7/2022 | Winblad | G06F 13/28 |
| 11,409,685 B1* | 8/2022 | Kaplan | H04L 67/1095 |
| 11,644,834 B2* | 5/2023 | Ditty | G06F 15/7807 |
| | | | 701/23 |
| 11,698,860 B2* | 7/2023 | Raval | G06F 12/063 |
| | | | 711/202 |
| 11,914,545 B2* | 2/2024 | Waechter | H04L 67/303 |
| 2018/0046913 A1* | 2/2018 | Yu | G06F 13/102 |
| 2019/0205244 A1* | 7/2019 | Smith | G06F 3/065 |
| 2019/0364492 A1* | 11/2019 | Azizi | H04W 68/005 |
| 2021/0200437 A1* | 7/2021 | Li | G06N 3/08 |
| 2022/0124543 A1* | 4/2022 | Orhan | G06N 3/006 |

\* cited by examiner

214a

214b

Mapping Table 1

Mapping Table 2

216d

Mapping Table 1

Mapping Table 2

AUXILIARY PROCESSOR AND ELECTRONIC SYSTEM COMPRISING THE SAME

CROSS-REFERENCE TO RELATED APPLICATION

This U.S. non-provisional patent application claims priority under 35 U.S.C. 119 Korean Patent Application No. 10-2021-0135592 filed on Oct. 13, 2021 in the Korean Intellectual Property Office, the contents of which is incorporated by reference in its entirety herein.

TECHNICAL FIELD

The present invention relates to an auxiliary processor and an electronic system including the same.

DISCUSSION OF RELATED ART

An electronic system may include an auxiliary processor connected to a central processing unit (CPU) through a bus. For example, work of the CPU may be offloaded to the auxiliary processor to improve system performance.

The auxiliary processor may communicate with the CPU using an interrupt. However, use of the interrupt may slow down an operating speed of the electronic system.

SUMMARY

An embodiment of the present invention provides an auxiliary processor having an increased operating speed.

An embodiment of the present invention also provides an electronic system including the auxiliary processor having an increased operating speed.

According to an embodiment of the present inventive concept, there is provided an electronic system including an auxiliary processor. The auxiliary processor includes a remapping device which receives data through a direct memory access (DMA), a register unit which stores the data, and processing logic which transmits operating status information to the remapping device. The remapping device remaps position information in which the data is stored in the register unit on the basis of the operating status information.

According to an embodiment of the present inventive concept, there is provided an electronic system including a central processing unit (CPU) and an auxiliary processor which communicates with the central processing unit through a bus. The auxiliary processor includes a remapping device which receives data through a direct memory access (DMA), a register unit which store the data, and processing logic which transmits operating status information to the remapping device, wherein the remapping device remaps position information in which the data is stored in the register unit on the basis of the operating status information.

According to an embodiment of the present inventive concept, there is provided an electronic system including a sensor which converts an external stimulus into an electric signal, a storage device which stores the electric signal as data, a central processing unit (CPU) which controls the data, and an auxiliary processor which communicates with the CPU through a bus. The auxiliary processor includes a remapping device which receives data through a direct memory access (DMA), a register unit which stores the data, and processing logic which transmits operating status information to the remapping device. The remapping device remaps position information in which the data is stored in the register unit on the basis of the operating status information.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
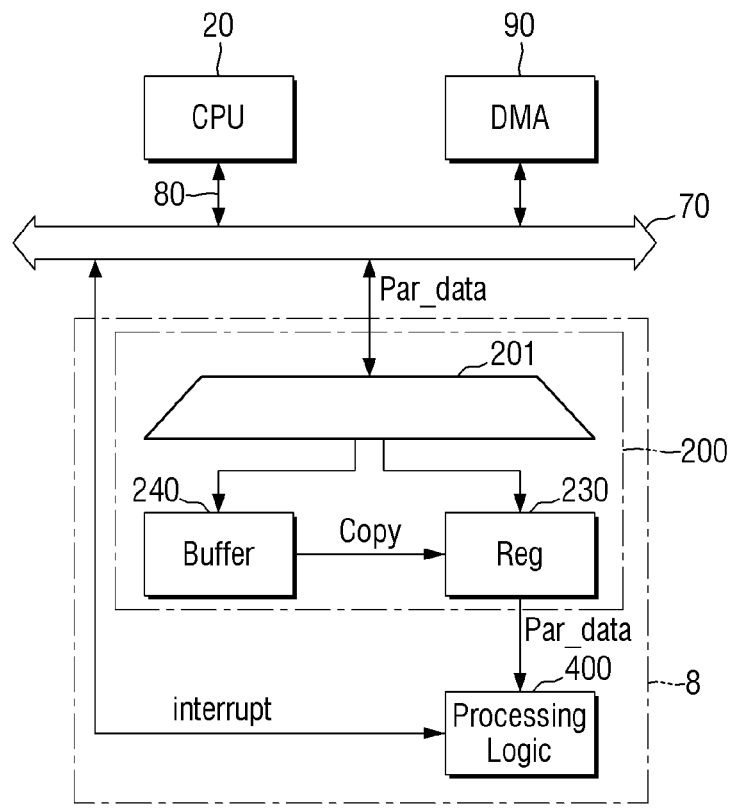
FIG. 1 is an exemplary block diagram for explaining an interrupt of a central processing unit.

FIG. 1 is an exemplary block diagram for explaining an interrupt of a central processing unit.

Referring to FIG. 1, a central processing unit 20 and/or a direct memory access (DMA) device 90 may communicate with an auxiliary processor 8 through a communication link 80 and a bus 70.

The central processing unit 20 may include a central processing unit core, and may further include a controller for controlling other devices connected to the bus 70.

The DMA 90 may send and receive data Par_data to and from the auxiliary processor 8, in place of the central processing unit 20.

The central processing unit 20 may receive assistance from an auxiliary processor 8 which is a dedicated circuit (or an accelerator, hereinafter commonly referred to as an auxiliary processor), when performing high-speed data computation such as an artificial intelligence (AI) data computation.

The auxiliary processor 8 may include, for example, a Graphics Processing Unit (GPU), a Neural Processing Unit (NPU), an Image Signal Processor (ISP), a Digital Signal Processor (DSP), and/or a Data Processing Unit (DPU), and may be implemented as a separate chip that is physically independent of the other constituent elements of the central processing unit 20.

Auxiliary processors 8 that assist with operations of the central processing unit 20 may include, for example, programmable integrated circuits such as a Field Programmable Gate Array (FPGA), a programmable integrated circuit (IC) and/or an Application Specific IC (ASIC).

The bus 70 may serve as a communication passage between the central processing unit 20 and other circuit blocks (for example, the auxiliary processor 8) constituting the electronic system. The bus 70 may be, for example, an Advanced Peripheral Bus (APB).

The communication link 80 is an interconnection circuit that may communicate with the central processing unit 20 through the bus 70. The communication link 80 may be, for example, an Advanced Microcontroller Bus Architecture eXtensible Interface (AMBA AXI) bus. The AMBA AXI bus is an embedded microcontroller bus interface for use in setting on-chip connections between circuit blocks and/or systems that make up the electronic system. The communication link 80 is not limited to the AMBA AXI. The communication link 80 may include, for example, other types of buses, a network-on-chip (NoC), a crossbar or other types of switches.

The auxiliary processor 8 may receive the data Par_data from other circuit blocks connected to the bus 70. The data Par_data may include various data used to operate the electronic system. The data Par_data may be, for example, parameter data for adjusting the parameters of a signal received from a sensor (e.g., an image sensor) connected to the bus 70.

The auxiliary processor 8 may also receive an interrupt from the central processing unit 20 through the bus 70 and the communication link 80.

The auxiliary processor 8 may include a multiplexer 201 that receives the data Par_data, a buffer 240 that stores the data Par_data, a register 230, and processing logic 400 ( ) that controls an overall operation of the auxiliary processor 8.

The buffer 240 may be configured by, for example, a Static Random Access Memory (SRAM). The register 230 may be configured by, for example, a flip-flop.

The processing logic 400 of the auxiliary processor 8 may perform a control operation, using the data Par_data. At this time, when other data is to the processing logic input during the operation of the processing logic 400, an error may occur in the operation that is being performed.

Therefore, the processing logic 400 may transmit its own status to the central processing unit 20 through the interrupt. Further, the central processing unit 20 that has received the interrupt from the processing logic 400 may determine whether to transmit the data Par_data to the auxiliary processor 8 depending on the status of the processing logic 400.

Figure 2:
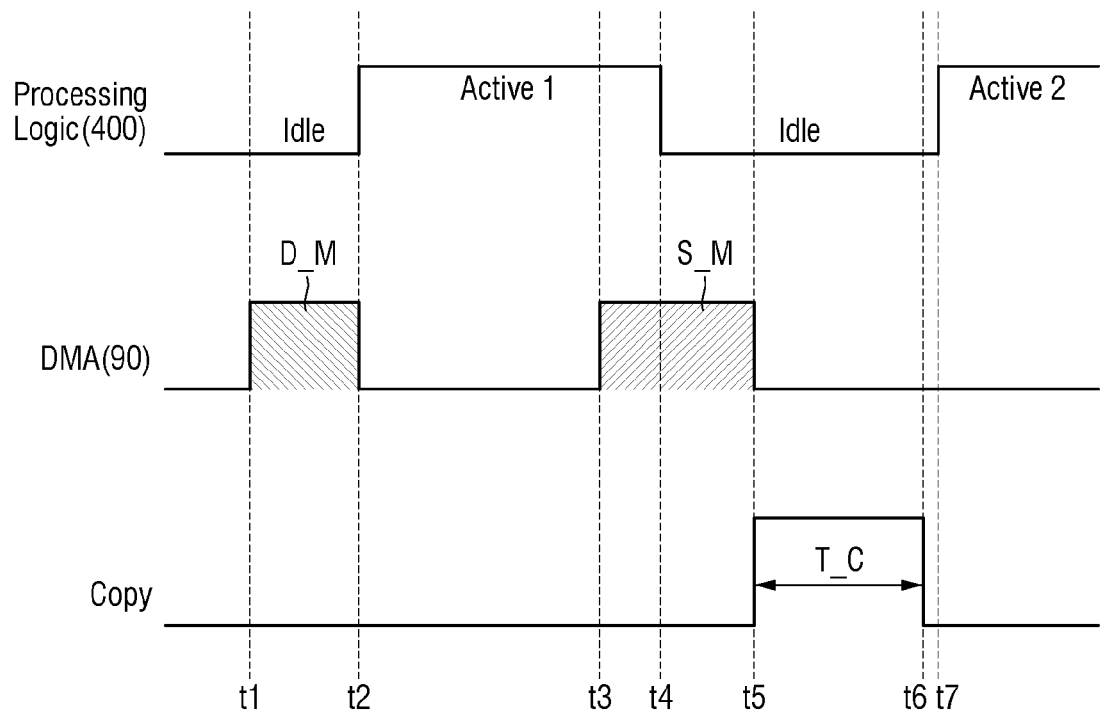
FIG. 2 is an exemplary timing diagram for explaining a decline in speed of the electronic system due to the interrupt of the central processing unit.

FIG. 2 is an exemplary timing diagram for explaining a decline in speed of the electronic system due to the interrupt of the central processing unit.

Referring to FIGS. 1 and 2, when the processing logic 400 is already performing a control operation using the data Par_data (for example, a first active status (Active 1) from a second time t2 to a fourth time t4), the processing logic 400 transmits the interrupt to the central processing unit 20 to notify that there is an active status in which the processing logic 400 itself currently performs the control operation. In this case, the central processing unit 20 may interrupt the transmission of data Par_data to the auxiliary processor 8.

Further, the processing logic 400 may notify the central processing unit 20 of an idle status (for example, an idle section from a fourth time t4 to a seventh time t7) after the control operation is completed using the data Par_data. In this case, the central processing unit 20 may transmit other data Par_data to the auxiliary processor 8. The auxiliary processor 8 may store other received data Par_data in the register 230, using the multiplexer 201. The processing logic 400 may perform the control operation again, using the data Par_data stored in the register 230 (for example, a second active status (Active 2) from the seventh time t7).

At this time, the other data Par_data may be transmitted to the register 230 through the direct mapping D_M using the DMA 90, for example, in the idle status of the processing logic 400 between the first time t1 and the second time t2.

If the data Par_data is transmitted to the auxiliary processor 8 during the operation of the processing logic 400 (for example, a third time t3) by the instruction of the central processing unit 20, the auxiliary processor 8 may store the data Par_data in the buffer 240 until the processing logic 400 enters the idle status.

At this time, the data Par_data transmitted through the DMA 90 may be stored in the buffer 240 through shadow mapping S_M.

After that, when the processing logic 400 switches from the active status to the idle status, the auxiliary processor 8 copies the data Par_data of the buffer 240 to the register 230, and the processing logic 400 may perform the control operation, using the data Par_data stored in the register 230. For example, a copy time T_C from the fifth time t5 to the sixth time t6 may be required.

At this time, the operating speed of the electronic system including the auxiliary processor 8 may be reduced, by the copy time T_C generated by the operation of copying the data Par_data from the buffer 240 to the register 230. Therefore, by omitting the operation of transmitting the interrupt to the central processing unit 20 by the auxiliary processor 8 and shortening the copy time T_C as much as possible, the operating speed of the electronic system including the auxiliary processor 8 can be increased. To this end, a remapping device that determines the operating status of the processing logic 400 and performs an operation of remapping the mapping information of the data Par_data accordingly may be required.

Hereinafter, a structure and operation that increases the operating speed of the electronic system including the auxiliary processor according to at least one embodiment, while minimizing communication of the auxiliary processor according to some embodiments with the central processing unit, using the remapping device will be explained in detail.

Figure 3:
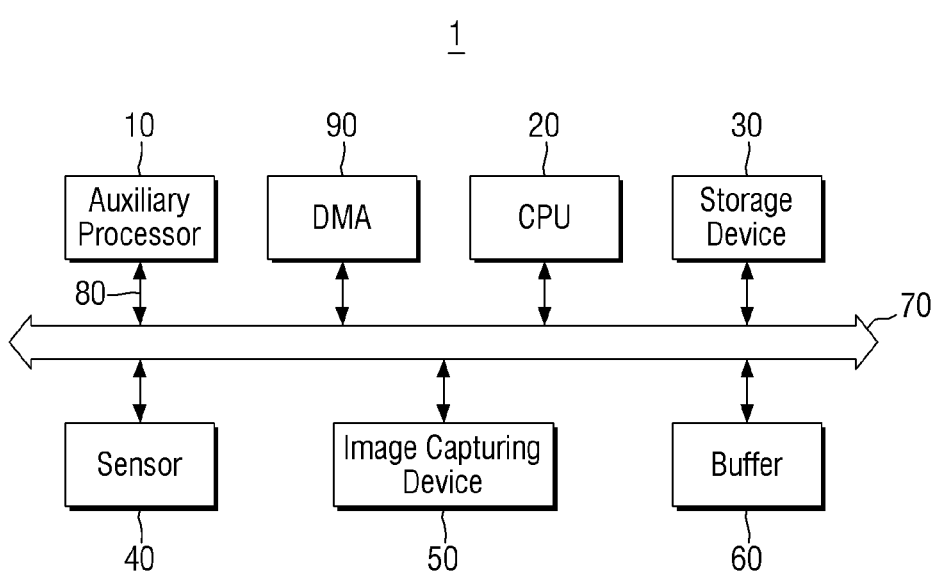
FIG. 3 is an exemplary block diagram for explaining an electronic system according to an embodiment of the inventive concept.

FIG. 3 is an exemplary block diagram for explaining an electronic system according to an embodiment of the inventive concept.

Referring to FIG. 3, the electronic system 1 according to an embodiment includes an auxiliary processor 10, a central processing unit 20, a storage device 30, a sensor 40, an image capturing device 50 (e.g., a camera), a buffer 60, a bus 70, a communication link 80, and a DMA 90 (e.g., a DMA device).

Since the detailed description of the central processing unit 20 and the DMA 90 was provided through FIG. 1, the description thereof will not be repeated.

The storage device 30 may include a non-volatile memory (NVM) that stores data. The non-volatile memory may include a flash memory of a 2-dimensional (2D) or a 3-dimensional (3D) V-NAND structure, but may also include other types of non-volatile memory such as a PRAM and/or a RRAM.

The buffer 60 may be used as a main storage device of the central processing unit 20 and may include, but is not limited to, a volatile memory such as a SRAM and/or a DRAM.

The image capturing device 50 may capture still images or moving images and may be a camera, a camcorder, and/or a webcam or the like.

The sensor 40 may sense various types of physical quantities that may be acquired from outside the electronic system 1 and convert the sensed physical quantities into electrical signals. Such a sensor 40 may be an optical sensor, an image sensor, a temperature sensor, a pressure sensor, an illuminance sensor, a position sensor, an acceleration sensor, a biosensor and/or a gyroscope sensor, and the like.

The auxiliary processor 10 according to an embodiment may increase the operating speed of the electronic system 1, by minimizing communication with the central processing unit 20. The configuration and operation of the auxiliary processor 10 according to an embodiment will be described in detail below.

Figure 4:
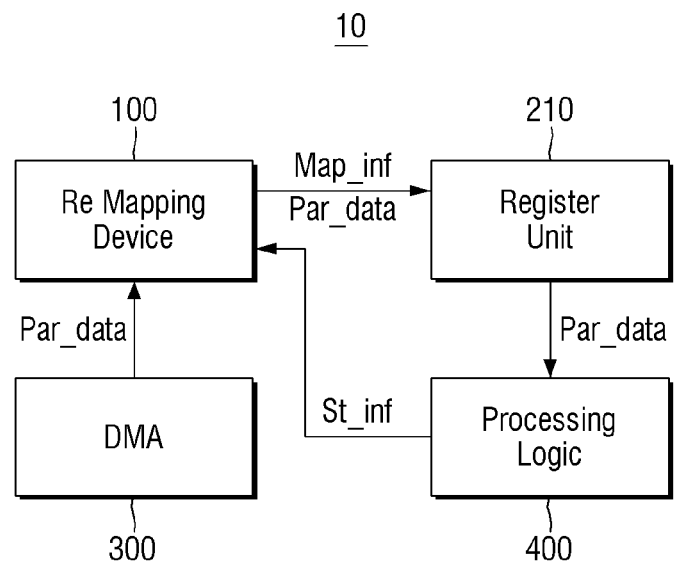
FIG. 4 is an exemplary block diagram for explaining an auxiliary processor according to an embodiment of the inventive concept.
Figure 5:
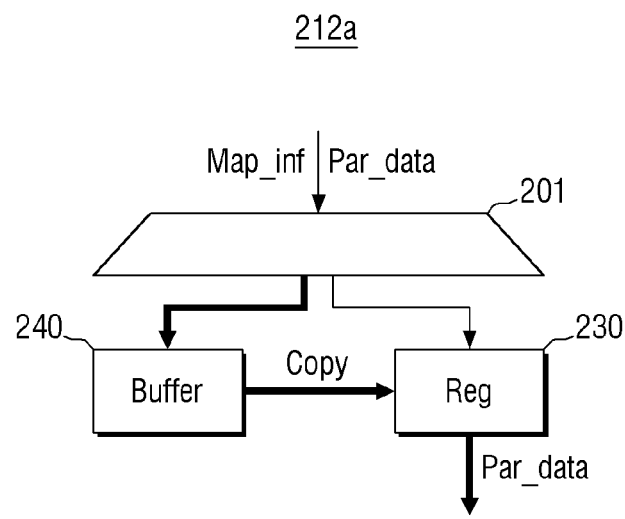
FIGS. 5 and 6 are exemplary block diagrams for explaining the operation of the auxiliary processor according to an embodiment of the inventive concept.
Figure 6:
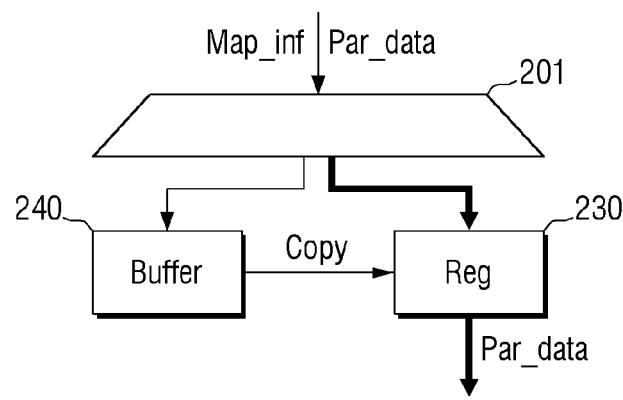

FIG. 4 is an exemplary block diagram for explaining an auxiliary processor according to an embodiment of the inventive concept. FIGS. 5 and 6 are exemplary block diagrams for explaining the operation of the auxiliary processor according to an embodiment of the inventive concept.

Referring to FIGS. 3 and 4, the auxiliary processor 10 according to an embodiment includes a remapping device 100, a register unit 210, a DMA 300, and a processing logic 400.

For reference, the DMA 300 of FIG. 4 may have a form in which the DMA 90 of FIG. 3 is placed inside the auxiliary processor 10. That is, the DMA 300 of FIG. 4 has a form in which the DMA is placed inside the auxiliary processor 10, and the DMA 90 of FIG. 3 has a form in which the DMA is placed outside the auxiliary processor 10.

Hereinafter, the description will be provided on the assumption that the DMA 300 be placed inside the auxiliary processor 10.

The remapping device 100 may perform a remapping operation on the mapping information of the data Par_data received from the DMA 300. In an embodiment, the remapping device 100 is implemented by a logic circuit. At this time, the remapping device 100 may perform the remapping operation on the mapping information of the data Par_data on the basis of the operating status information st_inf of the processing logic 400 received from the processing logic 400.

The operating status information st_inf may include, for example, information indicating that the processing logic 400 is in the active status in which the operation is currently being performed using the data Par_data. Further, the operating status information st_inf may include, for example, information indicating that the processing logic 400 is in an idle status after the execution of the operation using the data Par_data ends. For example, a value included in the operating status information st_inf may be a first value to indicate the active status and a second value different from the first value to indicate the idle status.

Hereinafter, the register unit 212a of FIG. 5 and the register unit 212b of FIG. 6 are diagrams divided to clearly show the transmission route of the data Par_data, and the register unit 212a of FIG. 5 and the register unit 212b of FIG. 6 may correspond to the register unit 210 of FIG. 4.

Specifically referring to FIGS. 3 to 5, the remapping device 100 remaps the mapping information about the data Par_data so as to be stored in the buffer 240, when the processing logic 400 is in the active status, on the basis of the operating status information st_inf. Such remapping information map_inf may be transmitted to the register unit 210 together with the data Par_data transmitted from the remapping device 100 to the register unit 210.

That is, the data Par_data remapped through the remapping device 100 may be transmitted to the processing logic 400 along a thick line path of the register unit 212a in accordance with the remapping information map_inf.

The register unit 212a showing the specific path will be explained in detail. The multiplexer 201 that has received the data Par_data together with the remapping information map_inf stores the data Par_data in the buffer 240. For example, the map_inf may include a control signal that is applied to a control terminal of the multiplexer 201 and has a first logic level to route the data Par_data to the buffer 240. After that, when the current processing logic 400 enters the idle status on the basis of the operating status information st_inf received from the processing logic 400, the data Par_data of the buffer 240 is copied to the register 230. After that, the data Par_data copied to the register 230 is transmitted to the processing logic 400.

Another example will be explained in detail through FIGS. 3, 4, and 6. When the processing logic 400 is in an idle status, on the basis of the operating status information st_inf, the remapping device 100 remaps the mapping information about the data Par_data so as to be stored in the register 230. Such remapping information map_inf may be transmitted to the register unit 210 together with the data Par_data transmitted from the remapping device 100 to the register unit 210.

That is, the data Par_data remapped through the remapping device 100 may be transmitted to the processing logic 400 along the thick line path of the register unit 212b in accordance with the remapping information map_inf. For example, the map_inf include a control signal that is applied to a control terminal of the multiplexer 201 and has a second logic level to route the data Par_data to the register 230.

The register unit 212b showing this specific path will be specifically explained. The multiplexer 201 that has received the data Par_data together with the remapping information map_inf stores the data Par_data in the register 230. After that, the data Par_data stored in the register 230 is transmitted to the processing logic 400.

As explained through FIGS. 3 to 6, the auxiliary processor 10 may modify the mapping information about the data Par_data by itself to perform a remapping operation such that the data Par_data may be stored at a desired storage position, without transmitting an interrupt related to the operating status information st_inf of the current processing logic 400 to the central processing unit 20 by the auxiliary processor 10. Accordingly, it is possible to increase the operating speed of the electronic system 1 including the auxiliary processor 10 according to an embodiment.

In addition, because information about the operating status of the processing logic 400 may be checked in real time through the operating status information st_inf, and the copy operation from the buffer 240 to the register 230 may be performed immediately, the time required for the copy operation can be shortened. That is, this makes it possible to increase the operating speed of the electronic system 1 including the auxiliary processor 10 according to an embodiment.

The operation of increasing the operating speed of the electronic system 1 through the auxiliary processor 10 according to an embodiment will be explained in detail through the timing diagram of FIG. 7.

Figure 7:
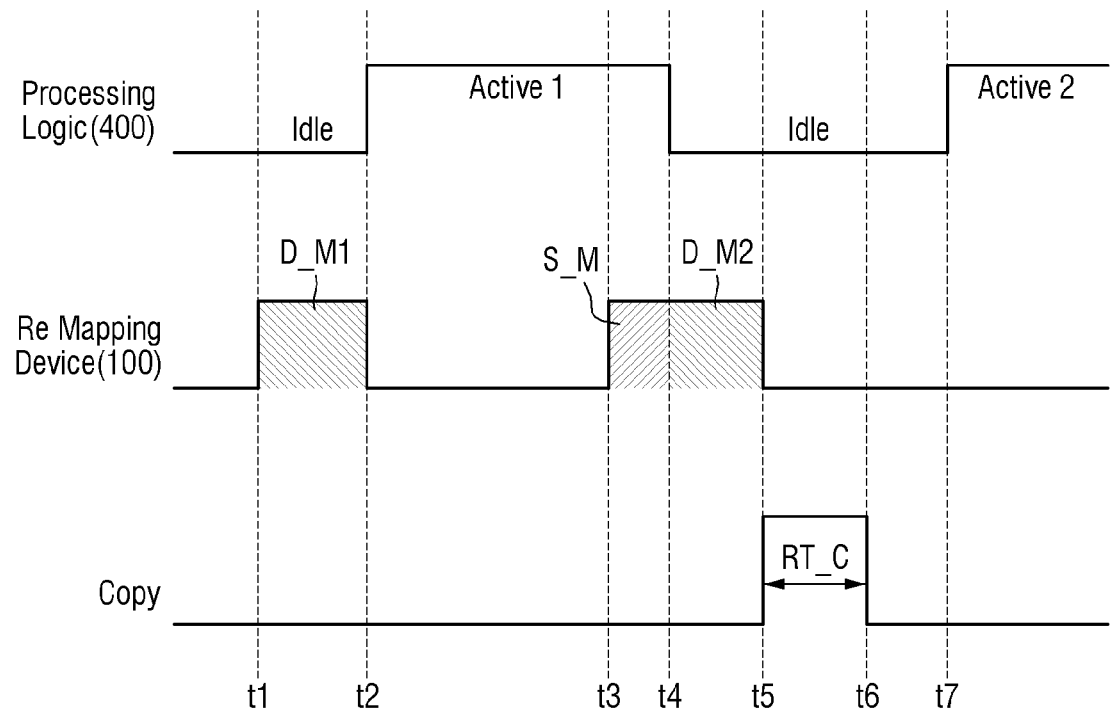
FIG. 7 is an exemplary timing diagram for explaining the operation of the auxiliary processor according to an embodiment of the inventive concept.

FIG. 7 is an exemplary timing diagram for explaining the operation of the auxiliary processor according to some embodiments.

Referring to FIGS. 3 to 7, when the processing logic 400 is already performing a control operation using the data Par_data (for example, the first active status (Active 1) from the second time t2 to the fourth time t4), the processing logic 400 transmits the operating status information st_inf to the remapping device 100 to notify that the logic 400 is in the active status (for example, the first active status (Active 1)) in which the control operation is currently being performed.

For example, when the remapping device 100 receives the data Par_data from the DMA 300 at the third time t3 during which the processing logic 400 is in the first active status (Active 1), the remapping device 100 may perform a shadow mapping S_M operation that modifies the mapping information of the data Par_data so that the data Par_data may be stored in the buffer 240 of the register unit 210.

Further, the processing logic 400 may notify the remapping device 100 of the idle status (for example, the idle section from the fourth time t4 to the seventh time t7) after completion of the control operation through the operating status information st_inf, using the data Par_data. In this case, the remapping device 100 may perform the direct mapping operation D_M2 that modifies the mapping information of the data Par_data from the fourth time t4 to the fifth time t5 so that the data Par_data received from the DMA 300 may be stored in the register 230.

After that, the processing logic 400 may perform the control operation again, using the data Par_data stored in the register 230 (for example, the second active status Active 2 from the seventh time t7).

In another example, the processing logic 400 may notify the remapping device 100 of the idle status (for example, an arbitrary section in the direction of the first time t1 from before the second time t2) after completion of the control operation through the operating status information st_inf, using the data Par_data. In this case, the remapping device 100 may perform the direct mapping operation D_M1 that modifies the mapping information of the data Par_data from first time t1 to second time t2 so that the data Par_data received from the DMA 300 may be stored in the register 230. The processing logic 400 may perform a control operation during the first active status (Active 1) from the second time t2, using the data Par_data.

That is, as explained through FIGS. 3 to 7, the auxiliary processor 10 may modify the mapping information about the data Par_data by itself to perform the remapping operation such that the data Par_data may be stored at the desired storage position, without transmitting an interrupt related to the operating status information st_inf of the current processing logic 400 to the central processing unit 20 by the auxiliary processor 10. This makes it possible to increase the operating speed of the electronic system 1 including the auxiliary processor 10 according to an embodiment.

Further, the information about the operating status of the processing logic 400 may be checked in real time through the operating status information st_inf, and the mapping information of the data Par_data may be directly changed at the fourth time t4 within the third time t3 to the fifth time t5 at which the data Par_data is received from the DMA 300.

Therefore, compared to the copy time T_C required in FIG. 2, the time required for the copy operation RT_C performed by remapping the data Par_data can be further shortened, using the auxiliary processor 10 according to an embodiment. This makes it possible to improve the operating speed of the electronic system 1 including the auxiliary processor 10 according to some embodiments.

Figure 8:
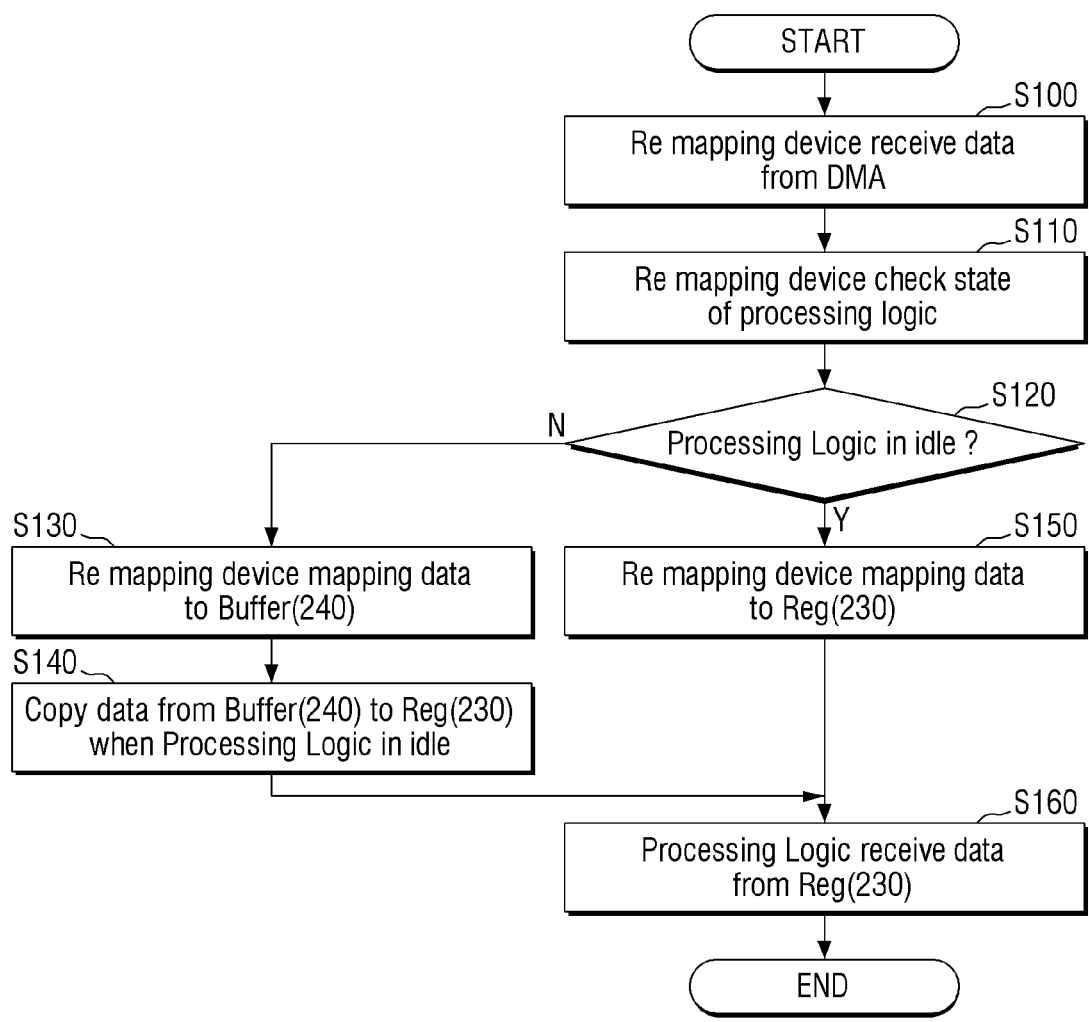
FIG. 8 is an exemplary flowchart for explaining the operation of the auxiliary processor according to an embodiment of the inventive concept.

FIG. 8 is an exemplary flowchart for explaining the operation of the auxiliary processor according to an embodiment.

Referring to FIGS. 3 to 6 and 8, the remapping device 100 receives the data Par_data from the DMA 300 (S100).

The remapping device 100 checks the operating status information st_inf of the processing logic 400 to perform a remapping operation on the mapping information of the received data Par_data (S110).

At this time, the remapping device 100 determines whether the processing logic 400 is currently in the active status or the idle status (S120).

If the remapping device 100 determines that the processing logic 400 is in the active status on the basis of the operating status information st_inf (N), the remapping device 100 remaps the mapping information about the data Par_data so as to be stored in the buffer 240 (S130).

After that, when the current processing logic 400 enters the idle status, on the basis of the operating status information st_inf received from the processing logic 400, the data Par_data of the buffer 240 is copied to the register 230 (S140). After that, the data Par_data copied to the register 230 is transmitted to the processing logic 400 (S160).

If the processing logic 400 is in the idle status (Y), on the basis of the operating status information st_inf, the remapping device 100 remaps the mapping information about the data Par_data so as to be stored in the register 230 (S150).

After that, the data Par_data stored in the register 230 is transmitted to the processing logic 400 (S160).

Figure 9:
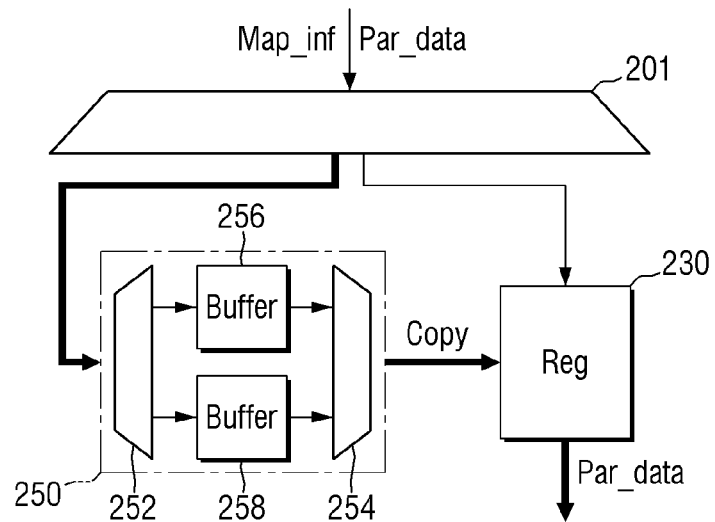
FIGS. 9 and 10 are exemplary block diagrams for explaining the operation of an auxiliary processor according to an embodiment of the inventive concept.
Figure 10:
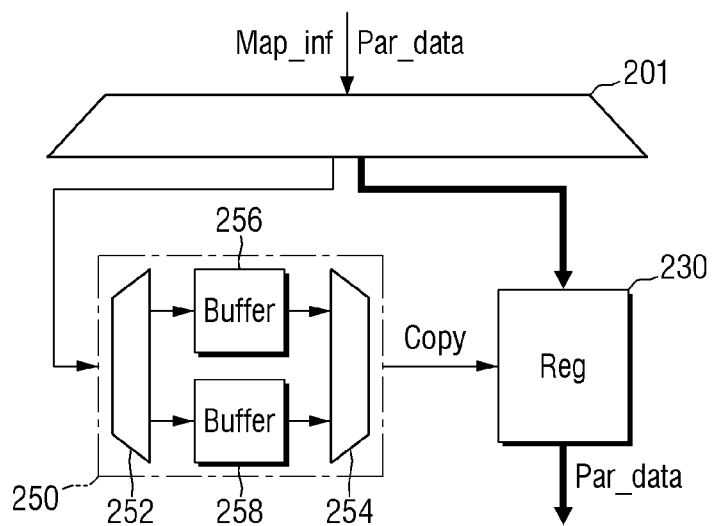

FIGS. 9 and 10 are exemplary block diagrams for explaining the operation of an auxiliary processor according to an embodiment of the inventive concept.

Hereinafter, a register unit 214*a* of FIG. 9 and a register unit 214*b* of FIG. 10 are diagrams divided to clearly show the transmission route of the data Par_data, and the register unit 214*a* of FIG. 9 and the register unit 214*b* of FIG. 10 may correspond to the register unit 210 of FIG. 4.

Unlike the register units 212*a* and 212*b* shown in FIGS. 5 and 6, in the register units 214*a* and 214*b* according to the embodiments shown in FIGS. 9 and 10, a buffer block 250 may be present instead of the buffers 240 of FIGS. 5 and 6.

Referring to FIGS. 3, 4, 9, and 10, the buffer block 250 may include a multiplexer 252, a demultiplexer 254, and a plurality of buffers 256 and 258. The number of buffers included in the buffer block 250 according to some embodiments is not limited to this drawing, and three or more buffers may be included.

Referring to FIGS. 3, 4, and 9, when the processing logic 400 is in the active status, on the basis of the operating status information st_inf, the remapping device 100 remaps the mapping information about the data Par_data so as to be stored in the buffers 256 and 258 of the buffer block 250. Such remapping information map_inf may be transmitted to the register unit 210, together with the data Par_data to be transmitted from the remapping device 100 to the register unit 210.

That is, the data Par_data remapped through the remapping device 100 may be transmitted to the processing logic 400 along the thick line path of the register unit 214a in accordance with the remapping information map_inf.

The register unit 214a showing the specific path will be explained in detail. The multiplexer 201 that has received the data Par_data together with the remapping information map_inf stores the data Par_data in the buffers 256 and 258 of the buffer block 250. After that, when the current processing logic 400 enters the idle status, on the basis of the operating status information st_inf received from the processing logic 400, the data Par_data stored in the buffers 256 and 258 is copied to the register 230. After that, the data Par_data copied to the register 230 is transmitted to the processing logic 400.

Another example will be explained in detail through FIGS. 3, 4, and 10. When the processing logic 400 is in the idle status, on the basis of the operating status information st_inf, the remapping device 100 remaps the mapping information about the data Par_data so as to be stored in the register 230. Such remapping information map_inf may be transmitted to the register unit 210, together with the data Par_data to be transmitted from the remapping device 100 to the register unit 210.

That is, the data Par_data remapped through the remapping device 100 may be transmitted to the processing logic 400 along the thick line path of the register unit 214b in accordance with the remapping information map_inf.

The register unit 214b showing this specific path will be explained in detail. The multiplexer 201 that has received the data Par_data together with the remapping information map_inf stores the data Par_data in the register 230. After that, the data Par_data stored in the register 230 is transmitted to the processing logic 400.

As explained through FIGS. 3, 4, 9, and 10, the auxiliary processor 10 may modify the mapping information about the data Par_data by itself to perform a remapping operation such that the data Par_data may be stored at a desired storage position, without transmitting an interrupt related to the operating status information st_inf of the current processing logic 400 to the central processing unit 20 by the auxiliary processor 10. This makes it possible to increase the operating speed of the electronic system 1 including the auxiliary processor 10 according to some embodiments.

Further, because the information about the operating status of the processing logic 400 may be checked in real time through the operating status information st_inf and the copy operation from the buffer block 250 to the register 230 may be immediately performed, the time required for the copy operation can be reduced. That is, this makes it possible to increase the operating speed of the electronic system 1 including the auxiliary processor 10 according to some embodiments.

The operation of increasing the operating speed of the electronic system 1 through the auxiliary processor 10 according to some embodiments will be explained in detail through the timing diagram of FIG. 11 and the mapping table of FIGS. 12 and 13.

Figure 11:
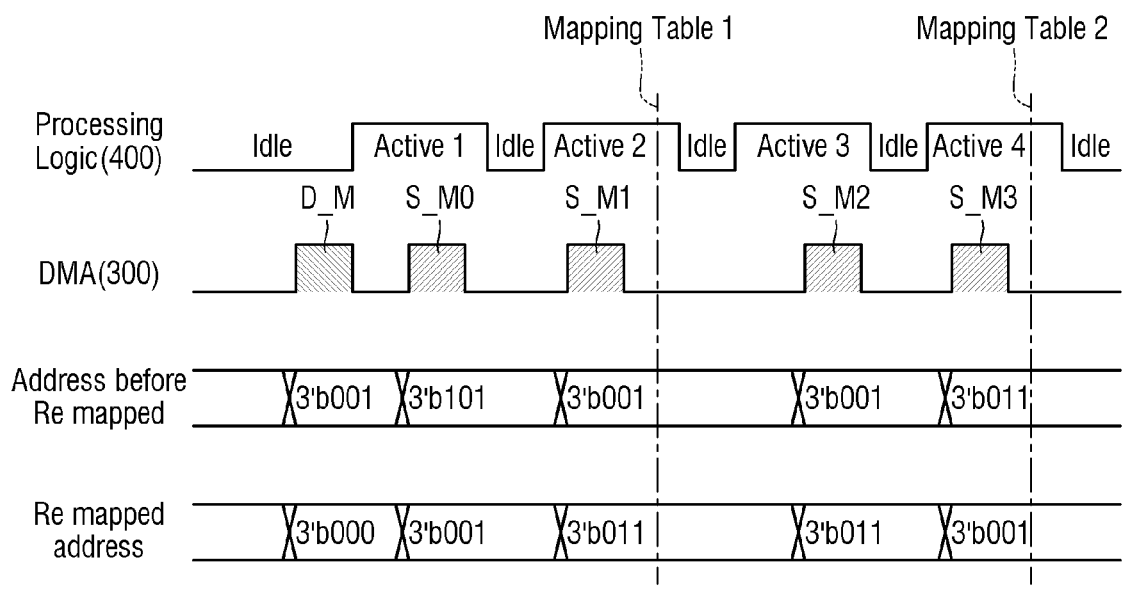
FIG. 11 is an exemplary timing diagram for explaining the operation of the auxiliary processor according to an embodiment of the inventive concept.

FIG. 11 is an exemplary timing diagram for explaining the operation of the auxiliary processor according to some embodiments. FIGS. 12 and 13 are exemplary tables for explaining the mapping table remapped through the remapping device.

Referring to FIGS. 3, 4, 9, and 10 to 13, for example, the number of settings of the shadow mapping that is set by the remapping device 100 for shadow mapping is assumed to be four (S_M0 to S_M3) in total. Further, the addresses that may be stored in the register unit 210 are assumed to be 18 bits in total. Further, the information stored in the buffer block 250 or the register 230 of the register unit 210 is assumed to be stored in the $[15]^{th}$ bit.

For example, if the mapping information about the data Par_data is set to 3'b000 for $[17:15]^{th}$ bit of the register unit 210, the data Par_data is remapped so as to be stored in the register 230. Further, for example, if the remapping device 100 sets the mapping information about the data Par_data to 3'b001 for the $[17:15]^{th}$ bit, the data Par_data to be transmitted from the DMA 300 is remapped to perform the shadow mapping (S_M 0). Further, for example, when the remapping device 100 sets the mapping information about the data Par_data to 3'b011 for the $[17:15]^{th}$ bit, the data Par_data to be transmitted from the DMA 300 is remapped to perform the shadow mapping (S_M 1). Further, for example, when the remapping device 100 sets the mapping information about the data Par_data to 3'b101 for the [17:15] bit, the data Par_data to be transmitted from the DMA 300 is remapped to perform the shadow mapping (S_M 2). Further, for example, when the remapping device 100 sets the mapping information about the data Par_data to 3'b111 for the $[17:15]^{th}$ bit, the data Par_data to be transmitted from the DMA 300 is remapped to perform the shadow mapping (S_M 3).

Figure 12:
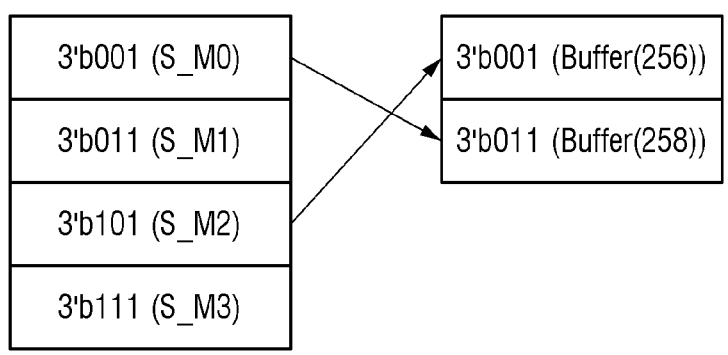
FIGS. 12 and 13 are exemplary tables for explaining a mapping table remapped through a remapping device.
Figure 13:
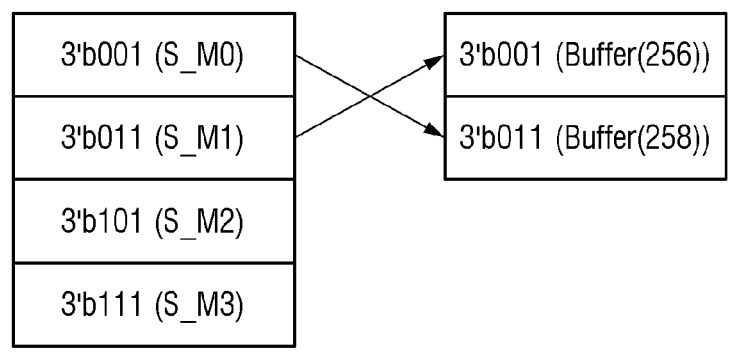

If the number of buffers 256 and 258 smaller than the set number of shadow mappings (for example, S_M 0 to S_M 3) is configured in the register unit 210 as in the examples of FIGS. 9 and 10, the auxiliary processor 10 according to some embodiments may continuously change the mapping table as shown in FIGS. 12 and 13.

Specifically, while the processing logic 400 is operating up to the second active status (Active 2), the remapping device 100 may generate the first mapping table (Mapping Table 1) through the execution of the remapping. For example, the remapping device 100 may remap the mapping information of the data Par_data to 3'b000 so that the direct mapping D_M is performed on the data Par_data received from the DMA 300, while the processing logic 400 is in the idle status. After that, when the processing logic 400 is in the first active status (Active 1), the remapping device 100 may remap the mapping information of the data Par_data to 3'b001 so that shadow mapping (S_M 0) is performed on the data Par_data received from the DMA 300. The data Par_data remapped to 3'b001 may be stored in the buffer 256. After that, when the processing logic 400 is in the second active status (Active 2), the remapping device 100 may remap the mapping information of the data Par_data to 3'b011 so that the shadow mapping (S_M 1) is performed on the data Par_data received from the DMA 300. The data Par_data remapped to 3'b011 may be stored in the buffer 258.

As another example, while the processing logic 400 is operating from the third active status (Active 3) to the fourth active status (Active 4), the remapping device 100 may modify the first mapping table (Mapping Table 1) through execution of the remapping to generate a second mapping table (Mapping Table 2). For example, when the processing logic 400 is in the third active status (Active 3), with respect to the data Par_data received from the DMA 300, the remapping device 100 may remap the mapping information of the data Par_data to 3'b011 so that shadow mapping (S_M 2) is performed on the data Par_data received from the DMA 300. The data Par_data remapped to 3'b011 may be stored in the buffer 258. After that, when the processing logic 400 is in the fourth active status (Active 4), the remapping device 100 may remap the mapping information of the data Par_data to 3'b001 so that shadow mapping (data S_M 3) is performed on the data Par_data received from the DMA 300. The data Par_data remapped to 3'b001 may be stored in the buffer 256.

The first mapping table (Mapping Table 1) and/or the second mapping table (Mapping Table 2) described above may be stored in the buffer 60 or may be stored in the remapping device 100.

Figure 14:
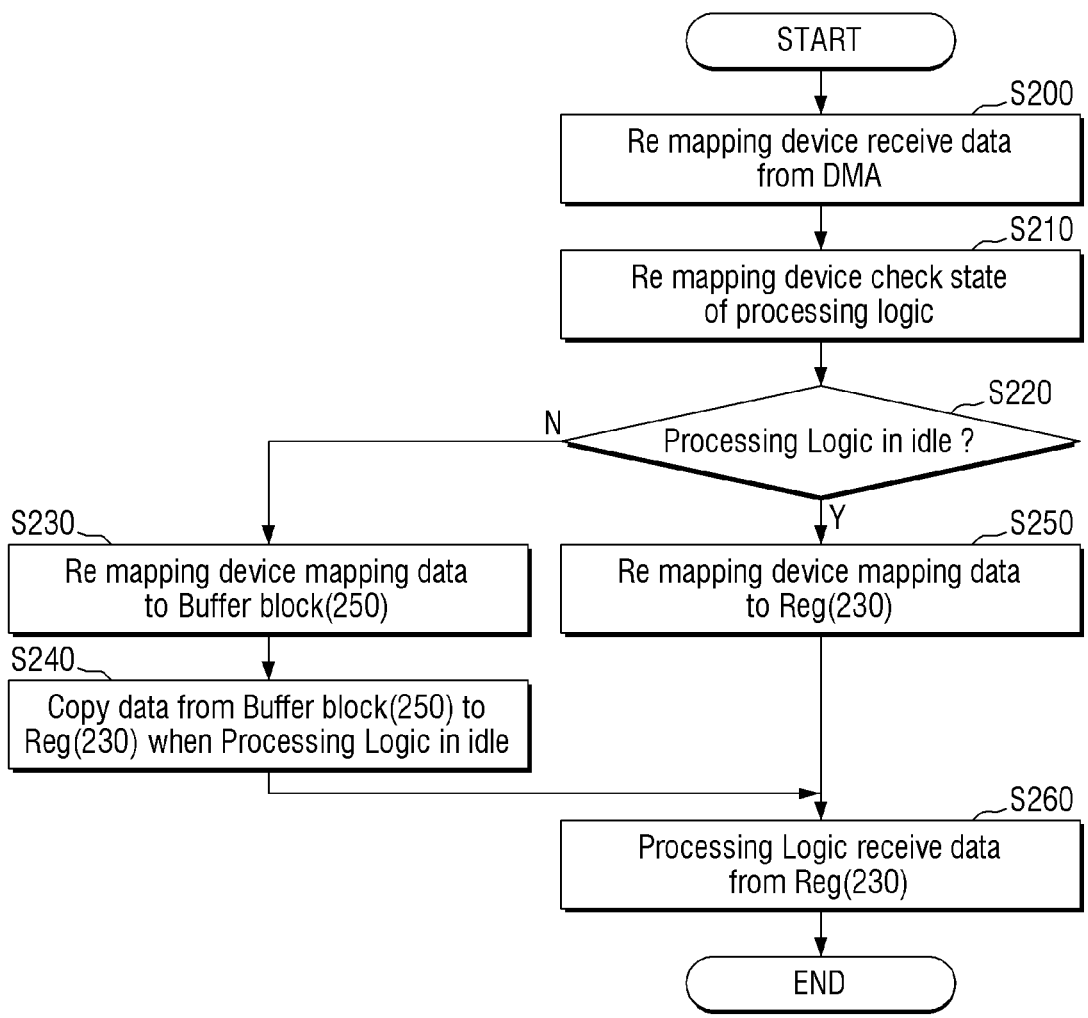
FIG. 14 is an exemplary flowchart for explaining the operation of the auxiliary processor according to an embodiment of the inventive concept.

FIG. 14 is an exemplary flowchart for explaining the operation of the auxiliary processor according to an embodiment.

Referring to FIGS. 3, 4, 9, 10, and 14, the remapping device 100 receives the data Par_data from the DMA 300 (S200).

The remapping device 100 checks the operating status information st_inf of the processing logic 400 to perform the remapping operation on the mapping information of the received data Par_data (S210).

At this time, the remapping device 100 determines whether the processing logic 400 is currently in the active status or the idle status (S220).

If the remapping device 100 determines that the processing logic 400 is in the active status on the basis of the operating status information st_inf (N), the remapping device 100 remaps the mapping information about the data Par_data so as to be stored in the buffer block 250 (S230).

After that, if the current processing logic 400 enters the idle status on the basis of the operating status information st_inf received from the processing logic 400, the data Par_data of the buffer block 250 is copied to the register 230 (S240). After that, the data Par_data copied to the register 230 is transmitted to the processing logic 400 (S260).

If the processing logic 400 is in the idle status (Y), the remapping device 100 remaps the mapping information about the data Par_data so as to be stored in the register 230 on the basis of the operating status information st_inf (S250).

After that, the data Par_data stored in the register 230 is transmitted to the processing logic 400 (S260).

Figure 15:
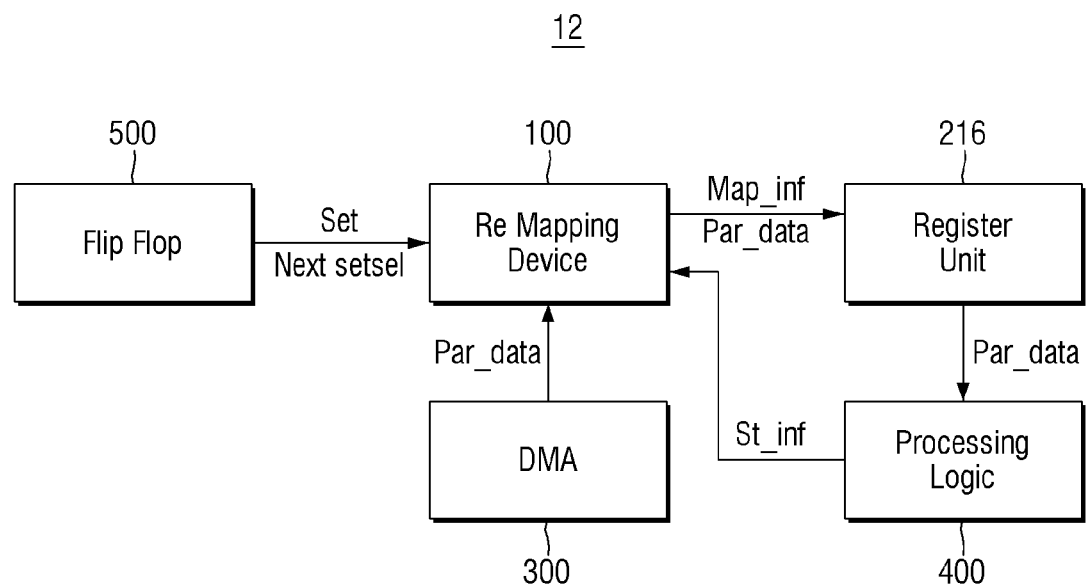
FIG. 15 is an exemplary block diagram for explaining an auxiliary processor according to an embodiment of the inventive concept.

FIG. 15 is an exemplary block diagram for explaining an auxiliary processor according to an embodiment. Repeated description of those described above will not be provided.

Referring to FIG. 15, unlike the electronic system 1 of FIG. 3, the electronic system 12 of FIG. 15 further includes a flip-flop 500. The flip-flop 500 may be, for example, a flip-flop that generates a Set value in which the counting sequentially increases, and a Next setsel value in which one count increases from the Set value.

The remapping device 100 may perform the remapping operation on the basis of the information of the Set and the Next setsel values received through the flip-flop 500.

At this time, the register unit 216 of the electronic system 12 of FIG. 15 according to some embodiments may include a plurality of registers. The operation of the electronic system 12 of FIG. 15 will be described through FIGS. 16 to 23.

FIGS. 16 to 19 are exemplary block diagrams for explaining the operation of the auxiliary processor according to an embodiment.

For reference, the registers 216a, 216b, 216c, and 216d of FIGS. 16 to 19 correspond to the register unit 216 of FIG. 15, and are only shown in separate drawings to clearly show a movement route of data Par_data.

Figure 16:
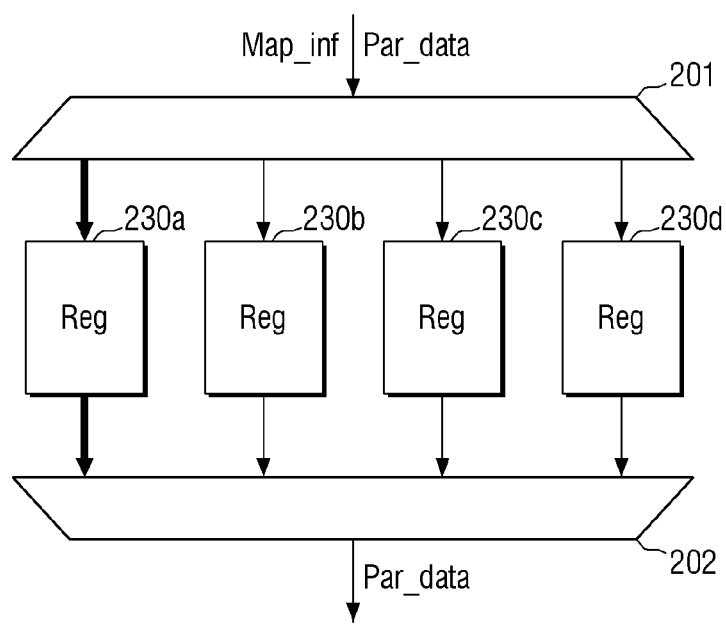
FIGS. 16 to 19 are exemplary block diagrams for explaining the operation of the auxiliary processor according to an embodiment of the inventive concept.

Referring to FIGS. 15 and 16, the remapping device 100 may perform the remapping operation on the data Par_data so that the data Par_data is stored in the first register 216a of the register unit 216a. The data Par_data stored in the first register 216a may be transmitted to the processing logic 400. The register 216a may include a multiplexer 201, registers 230a, 230b, 230c, and 230d, and a demultiplexer 202. The mapping information Map_inf causes the data Par_data to be routed through register 230a.

Figure 17:
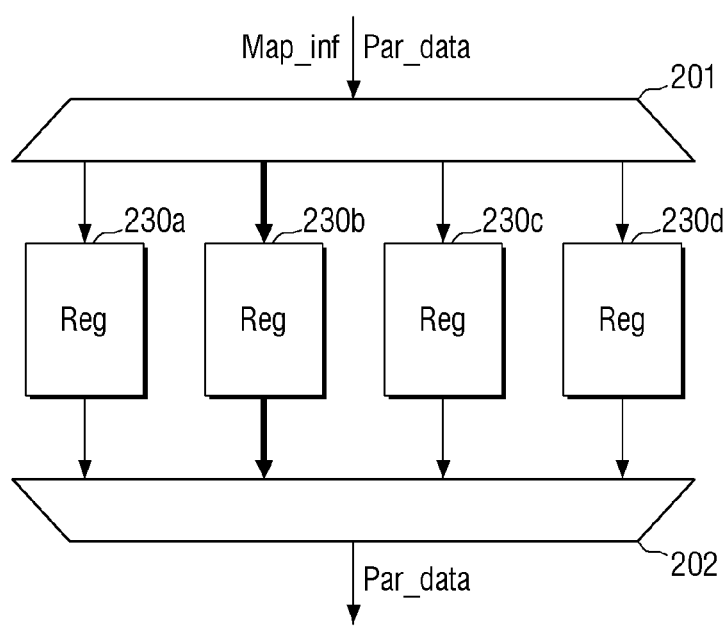

Referring to FIGS. 15 and 17, the remapping device 100 may perform the remapping operation on the data Par_data so that the data Par_data is stored in the second register 216b of the register unit 216b. The data Par_data stored in the second register 216b may be transmitted to the processing logic 400. The register 216b may include a multiplexer 201, registers 230a, 230b, 230c, and 230d, and a demultiplexer 202. The mapping information Map_inf causes the data Par_data to be routed through register 230b.

Figure 18:
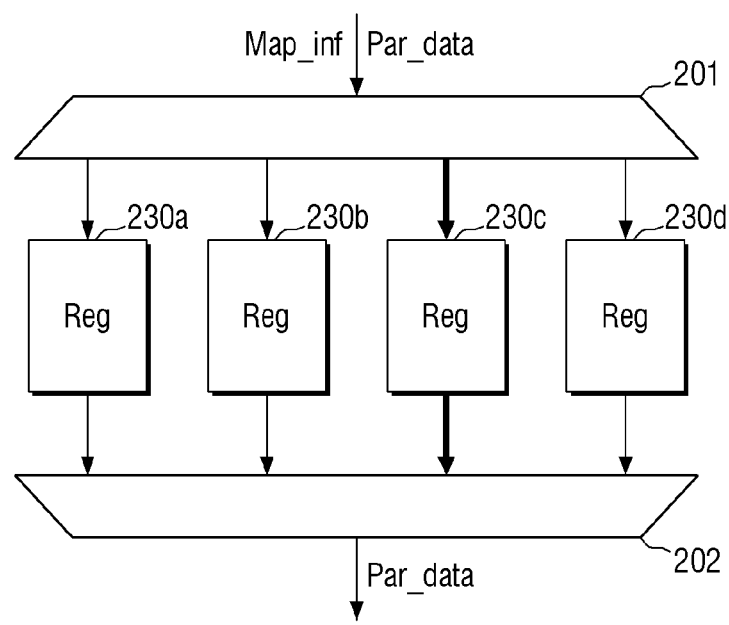

Referring to FIGS. 15 and 18, the remapping device 100 may perform the remapping operation on the data Par_data so that the data Par_data is stored in the third register 216c of the register unit 216c. The data Par_data stored in the third register 216c may be transmitted to the processing logic 400. The register 216c may include a multiplexer 201, registers 230a, 230b, 230c, and 230d, and a demultiplexer 202. The mapping information Map_inf causes the data Par_data to be routed through register 230c.

Figure 19:
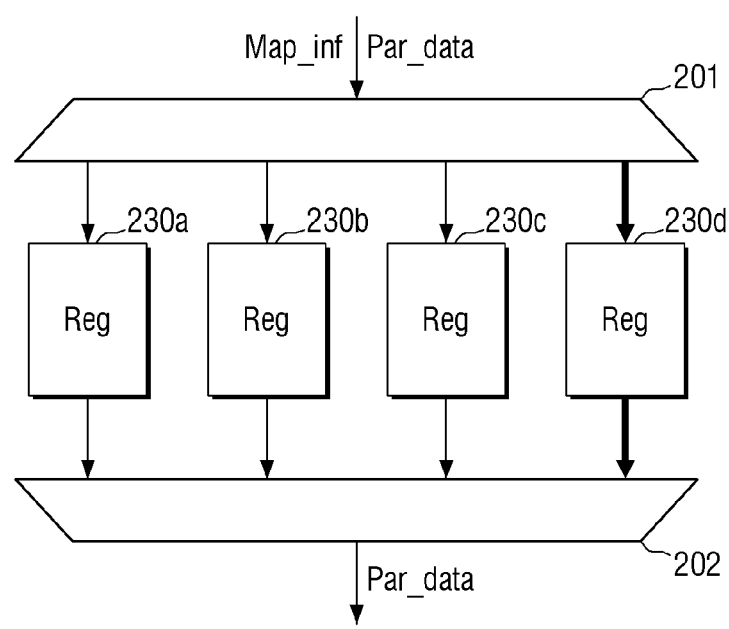

Referring to FIGS. 15 and 19, the remapping device 100 may perform the remapping operation on the data Par_data so that the data Par_data is stored in the fourth register 216d of the register unit 216d. The data Par_data stored in the fourth register 216d may be transmitted to the processing logic 400. The register 216d may include a multiplexer 201, registers 230a, 230b, 230c, and 230d, and a demultiplexer 202. The mapping information Map_inf causes the data Par_data to be routed through register 230d.

The remapping device 100 may perform the remapping operation such that the data Par_data is stored in at least one of a plurality of registers 216a, 216b, 216c, and 216d, without being limited to the above description. The number of registers included in the register unit 216 is not limited to FIGS. 16 to 19, and the number of registers may be two, three, or five or more.

The operation of the electronic system 12 of FIG. 15 will be explained through the timing diagram of FIG. 20 and the first mapping table (Mapping Table 1) and the second mapping table (Mapping Table 2) of FIGS. 21 and 22.

Figure 20:
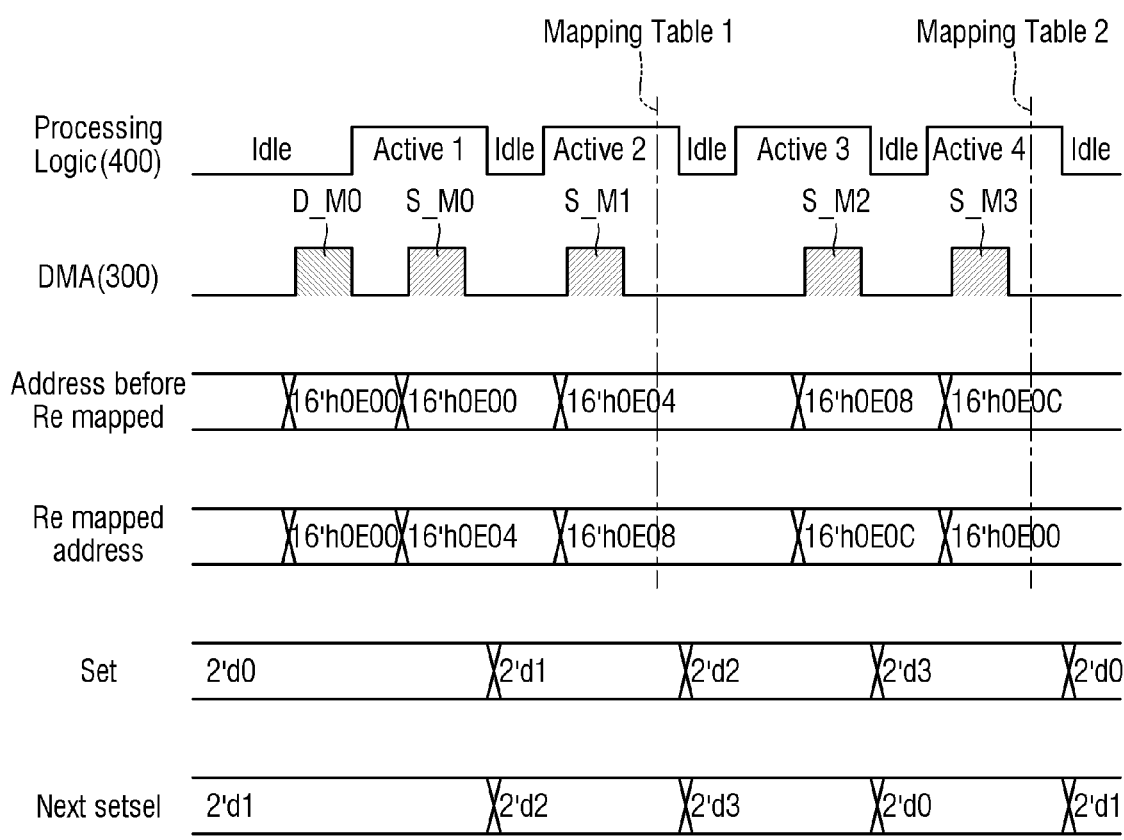
FIG. 20 is an exemplary timing diagram for explaining the operation of the auxiliary processor according to an embodiment of the inventive concept.

FIG. 20 is an exemplary timing diagram for explaining the operation of the auxiliary processor according to some embodiments. FIGS. 21 and 22 are exemplary tables for explaining the mapping table remapped through the remapping device.

Referring to FIGS. 15 to 20, each of the plurality of registers 216a, 216b, 216c, and 216d may be a register corresponding to the direct mapping (D_M 0), and may be a register corresponding to the shadow mappings (S_M 0, S_M 1, S_M 2 or S_M 3), depending on the situations.

For example, the flip-flop 500 may generate a Set value a Next setsel value whose counting value changes each time the active operation of the processing logic 400 ends. The Next setsel value may have a value which is counted by one or more than the Set value. For example, the Next setsel value may be a value incremented by one or more than the Set value.

For example, it is assumed that the flip-flop 500 has a Set value and a Next setsel value of 0 or more and 3 or less as 2-bit values.

Further, it is assumed that the address of the first register 216a of the register unit 216 is mapped to a hexadecimal number 16'h0E00, the address of the second register 216b of the register unit 216 is mapped to a hexadecimal number 16'h0E04, the address of the third register 216c of the register unit 216 is mapped to a hexadecimal number 16'h0E08, and the address of the fourth register 216d of the register unit 216 is mapped to a hexadecimal number 16'h0E0C.

At this time, the remapping device 100 may perform the remapping operation in a case where the mapping information about the data Par_data received from the DMA 300 is mapped to one of the hexadecimal number 16'h0E00, the hexadecimal number 16'h0E04, the hexadecimal number 16'h0E08, and the hexadecimal number 16'h0E0.

The remapping device 100 may perform the remapping operation on the data Par_data, referring to Set or Next setsel.

For example, the remapping device 100 performs the remapping operation on the basis of the Set value when the processing logic 400 is in the idle status. Further, for example, the remapping device 100 performs the remapping operation on the basis of the Next setsel value when the processing logic 400 is in the active status. For example, the Set value and the Next setsel value may be used to select one of the registers.

That is, when the processing logic 400 is in the idle status, the remapping device 100 may perform the remapping operation such that other data does not overlap the register in which the data Par_data is stored. For example, the remapping operation may be performed so that data written to a register is not overwritten before it is processed by the processing logic 400.

For example, when the processing logic 400 is in the idle status, it is assumed that the data Par_data received from the DMA 300 is mapped to 16h'0E00. At that time, the remapping device 100 remaps the data Par_data to 16'h0E00 referring to the Set value such that the data Par_data is stored in the first register 216a or register 230a.

After that, when the processing logic 400 is in the first active status, it is assumed that the data Par_data received from the DMA 300 be mapped to 16h0'E00. At that time, the remapping device 100 remaps the data Par_data to 16h'0E04, referring to the fact that the Next setsel value is 2'd1.

After that, when the processing logic 400 is in the second active status, it is assumed that the data Par_data received from the DMA 300 is mapped to 16h0'E04. At that time, the remapping device 100 remaps the data Par_data to 16h'0E08, referring to the fact that the Next setsel value is 2d'2.

As a result, the remapping device 100 may generate a mapping table such as a first mapping table (Mapping Table 1).

After that, when the processing logic 400 is in the third active status, it is assumed that the data Par_data received from the DMA 300 be mapped to 16h0'E08. At that time, the remapping device 100 remaps the data Par_data to 16h'0E0C, referring to the fact that the Next setsel value is 2'd3.

After that, when the processing logic 400 is in the fourth active status, it is assumed that the data Par_data received from the DMA 300 be mapped to 16h0'E0C. At that time, the remapping device 100 remaps the data Par_data to 16h'0E00, referring to the fact that the Next setsel is 2d'0.

As a result, the remapping device 100 may modify the first mapping table (Mapping Table 1) to generate a mapping table such as the second mapping table (Mapping Table 2).

Figure 21:
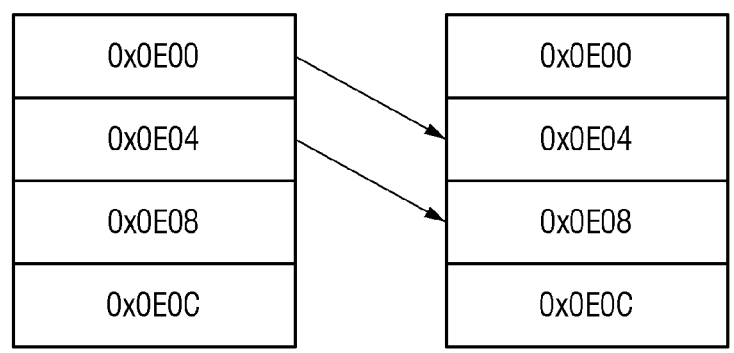
FIGS. 21 and 22 are exemplary tables for explaining a mapping table remapped through a remapping device.
Figure 22:
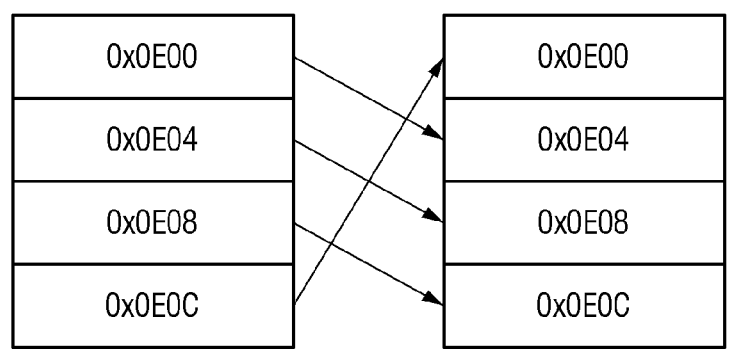

The first mapping table (Mapping Table 1) and/or the second mapping table (Mapping Table 2) of FIGS. 21 and 22 may be stored in the buffer 60, and may also be stored inside the remapping device 100, without being limited thereto.

Figure 23:
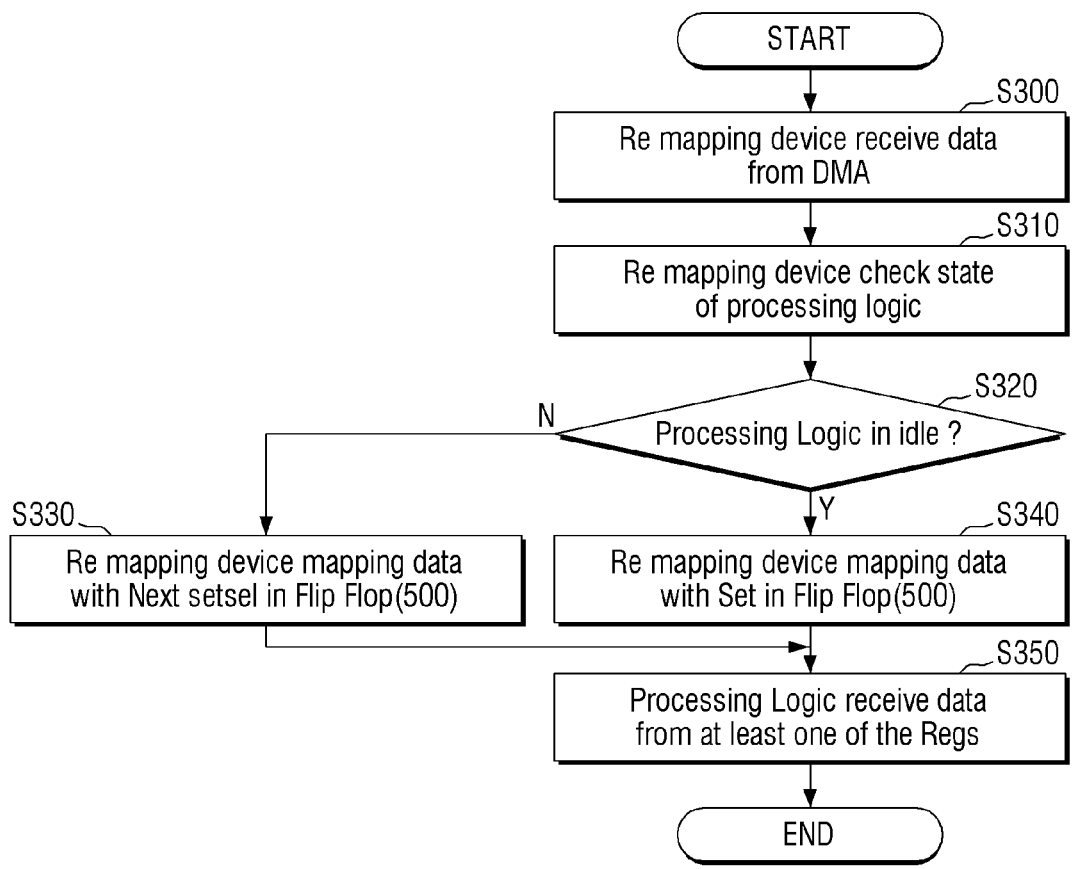
FIG. 23 is an exemplary flowchart for explaining the operation of an auxiliary processor according to an embodiment of the inventive concept.

FIG. 23 is an exemplary flowchart for explaining the operation of an auxiliary processor according to an embodiment.

Referring to FIGS. 15 to 19 and 23, the remapping device 100 receives the data Par_data from the DMA 300 (S300).

The remapping device 100 checks the operating status information st_inf of the processing logic 400 to perform the remapping operation on the mapping information of the received data Par_data (S310).

At this time, the remapping device 100 determines whether the processing logic 400 is currently in the active status or the idle status (S320).

If the remapping device 100 determines that the processing logic 400 is in the active status on the basis of the operating status information st_inf (N), the remapping device 100 remaps the mapping information about the data Par_data, referring to the Next setsel value from the flip-flop 500 (S330).

If the processing logic 400 is in the idle status (Y), the remapping device 100 remaps the mapping information about the data Par_data, on the basis of the operating status information st_inf, referring to the Set value from the flip-flop 500 (S340).

After that, the data Par_data stored in at least one of the plurality of registers 216a to 216d is transmitted to the processing logic 400 (S350).

Figure 24:
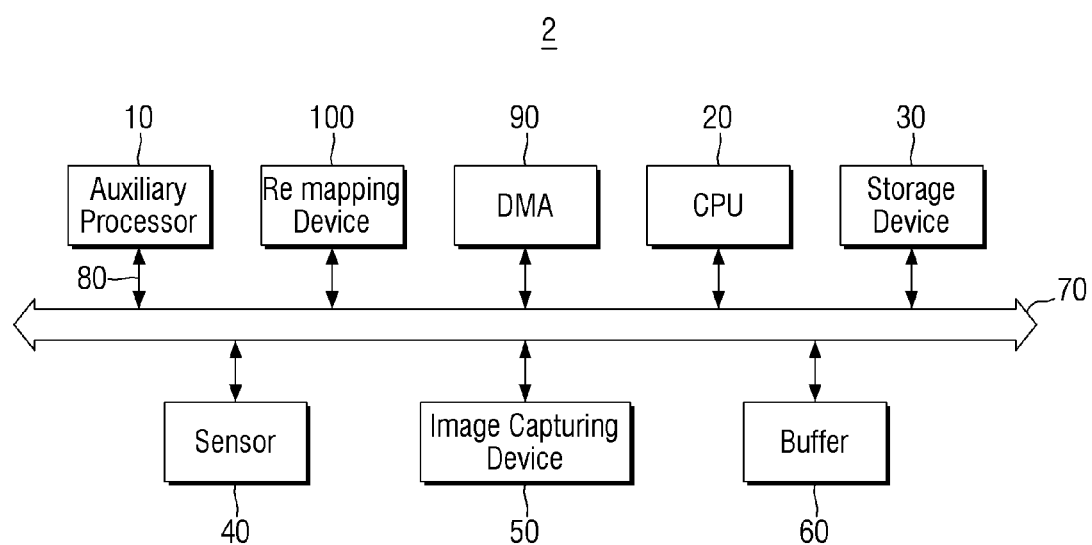
FIGS. 24 and 25 are exemplary block diagrams for explaining an auxiliary processor according to an embodiment of the inventive concept.
Figure 25:
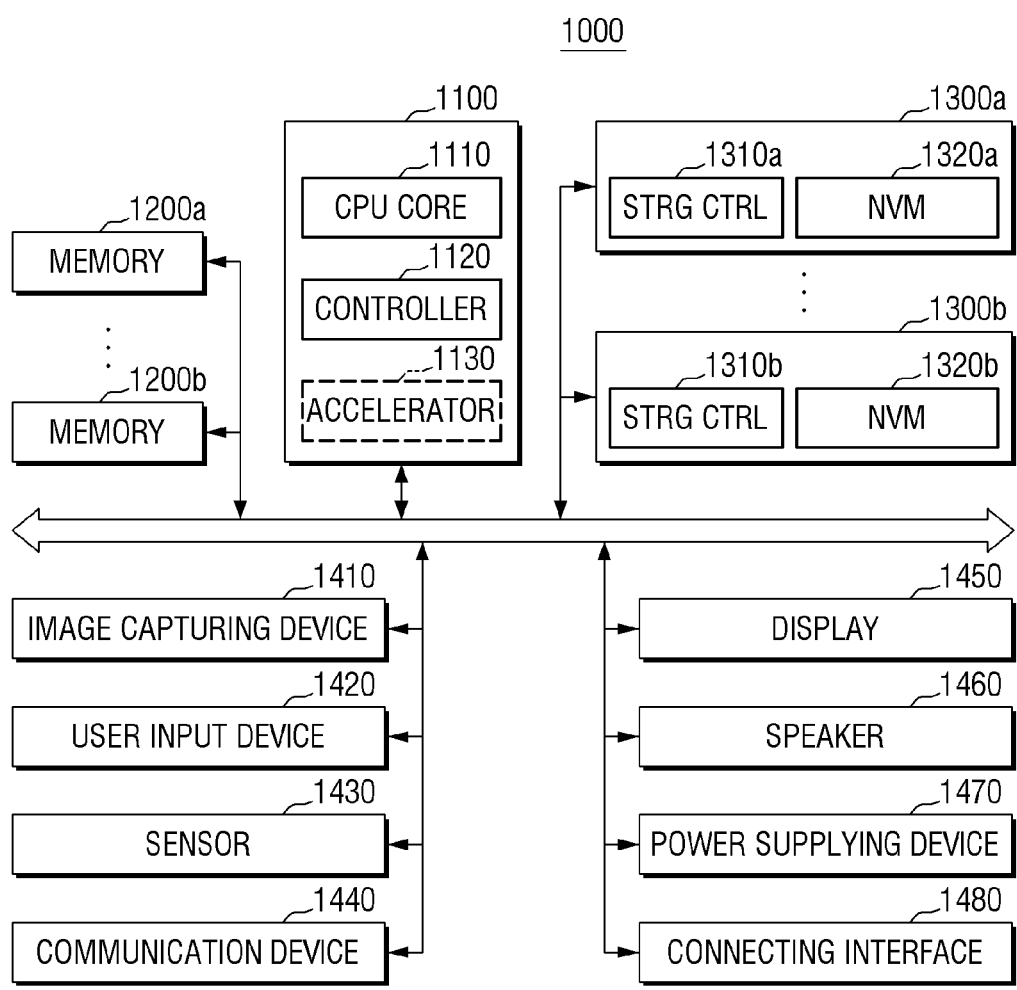

FIGS. 24 and 25 are exemplary block diagrams for explaining another auxiliary processor according to some embodiments.

Referring to FIG. 24, unlike the electronic system 1 of FIG. 3, the remapping device 100 of the electronic system 2 of FIG. 24 may be located outside the auxiliary processor 10.

Referring to FIG. 25, an electronic system 1000 to which the auxiliary processor according to some of the above embodiments explained above using FIGS. 3 to 23 is shown.

Referring to FIG. 25, the electronic system 1000 may be a mobile system, such as a mobile phone, a smart phone, a tablet personal computer (PC), a wearable device, a health-care device or an internet of things (JOT) device. However, the system 1000 of FIG. 25 is not necessarily limited to a mobile system, but may also be a personal computer, a laptop computer, a server, a media player, or an automotive device such as a navigation device.

Referring to FIG. 25, the system 1000 may include a main processor 1100, memories 1200a and 1200b, and storage devices 1300a, 1300b, and may additionally include one or more of an image capturing device 1410, a user input device 1420, a sensor 1430, a communication device 1440, a display 1450, a speaker 1460, a power supplying device 1470, and a connecting interface 1480.

The main processor 1100 may control the overall operations of the system 1000, more specifically, the operations of other components that make up the system 1000. Such a main processor 1100 may be implemented as a general purpose processor, a dedicated processor, an application processor, or the like.

The main processor 1100 may include one or more CPU cores 1110, and may further include a controller 1120 for controlling the memories 1200*a* and 1200*b* and/or the storage devices 1300*a* and 1300*b*. Depending on the embodiments, the main processor 1100 may further include an accelerator 1130, which is a dedicated circuit for a high-speed data computation such as artificial intelligence (AI) data computation. Such an accelerator 1130 may include a Graphics Processing Unit (GPU), a Neural Processing Unit (NPU) and/or a Data Processing Unit (DPU), and the like, and may be implemented as separate chips that are physically independent of other components of the main processor 1100. The accelerator 1130 includes the auxiliary processor 10 according to some of the embodiments described above through FIGS. 3 to 23.

The memories 1200*a* and 1200*b* may be used as a main memory unit of the system 1000, and may include a volatile memory such as an SRAM and/or a DRAM, but may also include a nonvolatile memory such as a flash memory, a PRAM and/or a RRAM. The memories 1200*a* and 1200*b* may also be implemented in the same package as the main processor 1100.

The storage devices 1300*a* and 1300*b* may function as nonvolatile storage devices for storing data regardless of whether power is supplied, and may have a relatively larger capacity than the memories 1200*a* and 1200*b*. The storage devices 1300*a* and 1300*b* may include storage controllers 1310*a* and 1310*b*, and non-volatile memories (NVM) 1320*a* and 1320*b* that store data under the control of the storage controllers 1310*a* and 1310*b*. The nonvolatile memories 1320*a* and 1320*b* may include a V-NAND flash memory of a 2-dimensional (2D) structure or a 3-dimensional (3D) structure, but may also include other types of nonvolatile memory such as a PRAM and/or a RRAM.

The storage devices 1300*a* and 1300*b* may be included in the system 1000 in a state of being physically separated from the main processor 1100, and may be implemented in the same package as the main processor 1100. Further, since the storage devices 1300*a* and 1300*b* have a shape such as a solid state device (SSD) or a memory card, the storage devices 1300*a* and 1300*b* may also be detachably coupled with other constituent elements of the system 1000 through an interface such as a connecting interface 1480 to be described below. Such storage devices 1300*a* and 1300*b* may be, but are not necessarily limited to, devices to which standard protocols such as a universal flash storage (UFS), an embedded multi-media card (eMMC) or a non-volatile memory express (NVMe) are applied.

The image capturing device 1410 may capture still images or moving images, and may be a camera, a camcorder, and/or a webcam and the like.

The user input device 1420 may receive various types of data that are input from users of the system 1000, and may be a touch pad, key pad, a key board, a mouse and/or a microphone.

The sensor 1430 may detect various types of physical quantities that may be acquired from the outside of the system 1000, and convert the detected physical quantities into electrical signals. Such a sensor 1430 may be a temperature sensor, a pressure sensor, an illuminance sensor, a position sensor, an acceleration sensor, a biosensor and/or a gyroscope.

The communication device 1440 may transmit and receive signals to and from other devices outside the system 1000 according to various communication protocols. Such a communication device 1440 may be implemented to include an antenna, a transceiver and/or a modem and the like.

The display 1450 and the speaker 1460 may each function as output devices that output visual and auditory information to the user of the system 1000.

The power supplying device 1470 may appropriately convert the power supplied from a battery (not shown) equipped in the system 1000 and/or an external power supply and supply the power to each constituent element of the system 1000.

The connecting interface 1480 may provide a connection between the system 1000 and an external device that may be connected to the system 1000 to transmit and receive data to and from the system 1000. The connecting interface 1480 may be implemented by various interface types, such as an Advanced Technology Attachment (ATA), a Serial ATA (SATA), an external SATA (e-SATA), a Small Computer Small Interface (SCSI), a Serial Attached SCSI (SAS), a Peripheral Component Interconnection (PCI), a PCI express (PCIe), a NVMe, an IEEE 1394, a universal serial bus (USB), a secure digital (SD) card, a multi-media card (MMC), an eMMC, a UFS, an embedded Universal Flash Storage (eUFS), and a compact flash (CF) card interface.

Although embodiments of the present disclosure have been described above with reference to the accompanying drawings, it will be understood by those of ordinary skill in the art that the present disclosure is not limited thereto and may be implemented in many different forms without departing from the technical idea or features thereof. Therefore, it should be understood that the embodiments set forth herein are merely examples in all respects and not restrictive.

What is claimed is:

1. An electronic system including an auxiliary processor, the auxiliary processor comprising:
    a remapping device which receives data through a direct memory access (DMA);
    a register unit which stores the data; and
    processing logic which transmits operating status information to the remapping device and processes the data stored in the register unit,
    wherein the remapping device maintains mapping information that enables first data received from the DMA to be stored at a first position of the register unit and remaps the mapping information to enable second data received from the DMA to be stored at a second other position within the register unit when the operating status information indicates a change in operating status of the processing logic between an idle status and an active status.

2. The electronic system of claim 1, wherein the auxiliary processor further comprises:
    a flip-flop which generates a Set value that increases sequentially, and a Next setsel value in which one count increases from the Set value,
    the register unit includes a plurality of registers, the Set value corresponds to an address value of a first register among the plurality of registers, and the Next setsel value corresponds to an address value of a second register among the plurality of registers.

3. The electronic system of claim 2, wherein the remapping device maps the data to the address value of the second register, when the operating status information indicates that the processing logic is in the idle status.

4. The electronic system of claim 2, wherein the remapping device maps the data to the address value of the first register, when the operating status information indicates that the processing logic is in the active status.

5. The electronic system of claim 1, wherein the register unit comprises:
a buffer;
a register; and
a multiplexer connected to the buffer and the register, when the operating status information indicates the processing logic is in the idle status and the data is stored in the buffer, the data is copied from the buffer to the register, and the copied data is transmitted from the register to the processing logic, and when the operating status information indicates the processing logic is in the idle status and the data is stored in the register, the data is transmitted directly from the register to the processing logic.

6. The electronic system of claim 5, wherein the remapping device maps the data to an address value of the register, when the operating status information indicates that the processing logic is in the idle status.

7. The electronic system of claim 5, wherein the remapping device maps the data to an address value of the buffer, when the operating status information indicates that the processing logic is in the active status.

8. The electronic system of claim 1, wherein the register unit comprises:
a buffer block including a multiplexer, a plurality of buffers, and a demultiplexer;
a register; and
a multiplexer connected to the buffer block and the register, when the operating status information indicates the processing logic is in the idle status and the data is stored in the buffer block, the data is copied from the buffer block to the register, and the copied data is transmitted from the register to the processing logic, and when the operating status information indicates the processing logic is in the idle status and the data is stored in the register, the data is transmitted directly from the register to the processing logic.

9. The electronic system of claim 8, wherein the remapping device maps the data to an address value, when the operating status information indicates that the processing logic is in the idle status.

10. The electronic system of claim 8, wherein the remapping device maps the data to an address value of at least a part of the plurality of buffers, when the operating status information indicates that the processing logic is in the active status.

11. An electronic system comprising:
a central processing unit (CPU); and
an auxiliary processor which communicates with the CPU through a bus,
wherein the auxiliary processor comprises:
a remapping device which receives data through a direct memory access (DMA);
a register unit which stores the data;
processing logic which transmits operating status information to the remapping device and processes the data stored in the register unit,
wherein the remapping device maintains mapping information that enables first data received from the DMA to be stored at a first position of the register unit and remaps the mapping information to enable second data received from the DMA to be stored at a second other position within the register unit when the operating status information indicates a change in operating status of the processing logic between an idle status and an active status.

12. The electronic system of claim 11, wherein the register unit comprises:
a buffer;
a register; and
a multiplexer connected to the buffer and the register, when the operating status information indicates the processing logic is in the idle status and the data is stored in the buffer, the data is copied from the buffer to the register, and the copied data is transmitted from the register to the processing logic, and when the operating status information indicates the processing logic is in the idle status and the data is stored in the register, the data is transmitted directly from the register to the processing logic.

13. The electronic system of claim 12, wherein the remapping device maps the data to an address value of the register, when the operating status information indicates that the processing logic is in the idle status.

14. The electronic system of claim 12, wherein the remapping device maps the data to an address value of the buffer, when the operating status information indicates that the processing logic is in the active status.

15. The electronic system of claim 11, wherein the auxiliary processor further comprises:
a flip-flop which generates a set value that increases sequentially, and a next setsel value in which one count increases from the set value,
wherein the register unit comprises a plurality of registers, the set value corresponds to an address value of a first register among the plurality of registers, and the next setsel value corresponds to an address value of a second register among the plurality of registers.

16. The electronic system of claim 11, wherein the register unit comprises:
a buffer block including a multiplexer, a plurality of buffers, and a demultiplexer;
a register; and
a multiplexer connected to the buffer block and the register, when the operating status information indicates the processing logic is in the idle status and the data is stored in the buffer block, the data is copied from the buffer block to the register, and the copied data is transmitted from the register to the processing logic, and when the operating status information indicates the processing logic is in the idle status and the data is stored in the register, the data is transmitted directly from the register to the processing logic.

17. An electronic system comprising:
a sensor which converts an external stimulus into an electric signal;
a storage device which stores the electric signal as data;
a central processing unit (CPU) which controls the data; and
an auxiliary processor which communicates with the CPU through a bus,
wherein the auxiliary processor comprises:
a remapping device which receives data through a direct memory access (DMA);
a register unit which stores the data; and
processing logic which transmits operating status information to the remapping device and processes the data stored in the register unit,
wherein the remapping device maintains mapping information that enables first data received from the DMA to be stored at a first position of the register unit and remaps the mapping information to enable second data received from the DMA to be stored at a second other position within the register unit when the operating status information indicates a change in operating status of the processing logic between an idle status and an active status.

18. The electronic system of claim 17, wherein the auxiliary processor further comprises:
- a flip-flop which generates a set value that increases sequentially, and a next setsel value in which one count increases from the set value, and wherein the register unit includes a plurality of registers,
- wherein the set value corresponds to an address value of a first register among the plurality of registers, and wherein the next setsel value corresponds to an address value of a second register among the plurality of registers.

19. The electronic system of claim 17, wherein the register unit comprises:
- a buffer;
- a register; and
- a multiplexer connected to the buffer and the register,
- when the operating status information indicates the processing logic is in the idle status and the data is stored in the buffer, the data is copied from the buffer to the register, and the copied data is transmitted from the register to the processing logic, and when the operating status information indicates the processing logic is in the idle status and the data is stored in the register, the data is transmitted directly from the register to the processing logic.

20. The electronic system of claim 17, wherein the register unit comprises:
- a buffer block including a multiplexer, a plurality of buffers, and a demultiplexer;
- a register; and
- a multiplexer connected to the buffer block and the register, when the operating status information indicates the processing logic is in the idle status and the data is stored in the buffer block, the data is copied from the buffer block to the register, and the copied data is transmitted from the register to the processing logic, and when the operating status information indicates the processing logic is in the idle status and the data is stored in the register, the data is transmitted directly from the register to the processing logic.

* * * * *